(12) United States Patent
Petluru et al.

(10) Patent No.: US 11,361,754 B2
(45) Date of Patent: Jun. 14, 2022

(54) METHOD AND SYSTEM FOR SPEECH EFFECTIVENESS EVALUATION AND ENHANCEMENT

(71) Applicant: CONDUENT BUSINESS SERVICES, LLC, Florham Park, NJ (US)

(72) Inventors: Snigdha Petluru, Secunderabad (IN); Nupur Labh, Bangalore (IN); Suchismita Naik, Bangalore (IN); Archana Ramakrishnan, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 175 days.

(21) Appl. No.: 16/749,318

(22) Filed: Jan. 22, 2020

(65) Prior Publication Data

US 2021/0225364 A1 Jul. 22, 2021

(51) Int. Cl.
*G10L 15/07* (2013.01)
*G10L 25/63* (2013.01)
(Continued)

(52) U.S. Cl.
CPC ............ *G10L 15/07* (2013.01); *G10L 15/063* (2013.01); *G10L 15/1815* (2013.01);
(Continued)

(58) Field of Classification Search
CPC ... G10L 15/07; G10L 15/063; G10L 15/1815; G10L 15/22; G10L 15/30; G10L 25/63; G10L 25/78; G10L 25/90; G10L 25/223
See application file for complete search history.

(56) References Cited

U.S. PATENT DOCUMENTS 5,647,834 A * 7/1997 Ron .......................... A61B 5/16
600/23
7,962,342 B1 * 6/2011 Coughlan ............... G10L 15/22
379/207.02
(Continued)

FOREIGN PATENT DOCUMENTS

CN 101826263 B * 1/2012
CN 103366610 A 10/2013
(Continued)

OTHER PUBLICATIONS

CN101826263B—translation (Year: 2012).*
(Continued)

*Primary Examiner* — Huyen X Vo
*Assistant Examiner* — Darioush Agahi
(74) *Attorney, Agent, or Firm* — Jones Robb, PLLC

(57) ABSTRACT

An automated training method enhances conversational effectiveness of a system participant interacting with a virtual client. The method operates on received speech input to produce text. A speech effectiveness analysis processor receives both the speech and text and produces quantified metrics measuring speech effectiveness based on the input parameters. Personalized feedback is generated based on the quantified metrics and is transmitted to the system participant. A virtual client dialog is generated using a dynamic simulation processor. The virtual client dialog is based on the quantified metrics, such that the virtual client responds to the speech input using the generated dialog.

20 Claims, 11 Drawing Sheets

(51) Int. Cl.
*G10L 25/90* (2013.01)
*G10L 25/78* (2013.01)
*G10L 15/22* (2006.01)
*G10L 15/18* (2013.01)
*G10L 15/30* (2013.01)
*G10L 15/06* (2013.01)

(52) U.S. Cl.
CPC .............. *G10L 15/22* (2013.01); *G10L 15/30* (2013.01); *G10L 25/63* (2013.01); *G10L 25/78* (2013.01); *G10L 25/90* (2013.01); *G10L 2015/223* (2013.01)

(56) References Cited

U.S. PATENT DOCUMENTS

| | | | |
|---|---|---|---|
| 9,418,484 | B2 | 8/2016 | Chiu et al. |
| 2005/0182625 | A1* | 8/2005 | Azara .................. G10L 25/51 704/236 |
| 2014/0191939 | A1* | 7/2014 | Penn ..................... G06F 3/01 345/156 |
| 2015/0029183 | A1 | 1/2015 | Chiu et al. |
| 2015/0280670 | A1* | 10/2015 | Kauffmann ........... G10L 21/034 381/107 |
| 2015/0317910 | A1 | 11/2015 | Daniels |
| 2016/0267922 | A1* | 9/2016 | Spizzo .................. A61B 5/743 |
| 2016/0316059 | A1* | 10/2016 | Nuta ...................... G06Q 10/04 |
| 2018/0061393 | A1* | 3/2018 | Osotio ................... G10L 25/63 |
| 2018/0203238 | A1 | 7/2018 | Smith, Jr. |
| 2018/0268344 | A1* | 9/2018 | Bastide .................. G06Q 30/01 |
| 2019/0057548 | A1 | 2/2019 | Singh et al. |
| 2020/0279559 | A1* | 9/2020 | Kawano ................. G10L 13/033 |
| 2021/0136209 | A1* | 5/2021 | Adibi ..................... G10L 17/06 |

FOREIGN PATENT DOCUMENTS

| | | | | |
|---|---|---|---|---|
| CN | 108010513 A | * | 5/2018 | |
| WO | 2009104324 | | 8/2009 | |
| WO | WO-2018169001 A1 | * | 9/2018 | ............. G10L 15/22 |

OTHER PUBLICATIONS

CN108010513A—translation (Year: 2018).*
WO2018169001A1—translation (Year: 2018).*
Ambady et al. "The 30-sec sale: Using thin-slice judgments to evaluate sales effectiveness." J. of Consumer Psychology, 16(1):4-13 (2006).
Chang et al., "Development and Behavioral Pattern Analysis of a Mobile Guide System with Augmented Reality for Painting Appreciation Instruction in an Art Museum." Computer and Education 71:185-197 (2014).
Cron et al. "Salesperson selection, training, and development: Trends, implications, and research opportunities." J. of Personal Selling & Sales Management 25(2):123-136 (2005).
Halford, G. S., "Children's Understanding: The Development of Mental Models." Hillsdale, NJ: Lawrence Erlbaum (1993).
Hamilton & Stewart, "Extending an information processing model of language intensity effects." Comm. Quart 41(2):231-246 (1993).
Ibáñez et al., "Experimenting with Electromagnetism Using Augmented Reality: Impact on Flow Student Experience and Educational Effectiveness." Computer and Education 71:1-13 (2014).
Ivy & Boone, "A behavioral science approach to effective sales presentations." J. of the Academy of Marketing Science, 4(1-2):456-466 (1976).
Lee, K., "Augmented Reality in Education and Training." TechTrends 56(2):13-21 (2012).
Leslie & Holloway, The sales learning curve. Harvard Business Review, 84(7/8):1-10 (2006).
Lewis et al., "Using appreciative inquiry in sales team development." Industrial and Commercial Training, 40(4):175-180 (2008).
Liu et al., "Outdoor Natural Science Learning with an RFID-Supported Immersive Ubiquitous Learning Environment." Educational Technology and Society 12:161-175 (2009).
Liu, T.Y., "A Context-Aware Ubiquitous Learning Environment for Language Listening and Speaking." J. of Computer Assisted Learning 25:515-527 (2009).
Rosenberg & Hirschberg, "Acoustic/prosodic and lexical correlates of charismatic speech", Interspeech—2005, pp. 513-516 (2005).
Rosenberg & Hirschberg, Charisma perception from text and speech. Speech Communication, 51(7):640-655 (2009).
Traunmüller & Eriksson, "The frequency range of the voice fundamental in the speech of male and female adults." Unpublished manuscript. Institutionen för lingvistik, Stockholms universitet, S-106 91 Stockholm, Sweden semanticscholar.org (1995).
Vate-U-Lan, P., "An Augmented Reality 3D Pop-Up Book: The Development of a Multimedia Project for English Language Teaching." 2012 IEEE International Conference on Multimedia and Expo, pp. 890-895 (2012).
Werner et al., "Augmenting behavior-modeling training: Testing the effects of pre-and post-training interventions." Human Resource Development Quarterly, 5(2):169-183 (1994).
Wu et al., "Current Status, Opportunities and Challenges of Augmented Reality in Education." Computers & Education 62:41-49 (2013).
Yen et al., "Augmented Reality in the Higher Education: Students' Science Concept Learning and Academic Achievement in Astronomy." Procedia—Social and Behavioral Sciences 103:165-173 (2013).
Yuen et al., "Augmented Reality: An Overview and Five Directions for AR in Education." J. of Educational Technology Development and Exchange 4:119-140 (2011).

\* cited by examiner

600

Passion —610

Average Passion across Conversation (x)
0<=x<3 - *Negative*
3<x<=5 - *Neutral*
5<x<=7 - *Positive*

Pause —620

Average Pause across Conversation (x)
x<=1      - *Negative*
1<x<2     - *Neutral*
2<=x<=3.5 - *Positive*
x>3.5     - *Negative*

Probe —630

% of Successful Probes (x)
Overall Number of Open Probes (y)
Overall Number of Closed Probes (z)

0<=x<=30 - *Negative*
y<z       - *Neutral*
y>=z      - *Positive*

Pivot —640

% of Successful Pivots (x)
Overall Number of Client Pivots (y)
Overall Number of Learner Pivots (z)
0<=x<=30  - *Negative*
y<z       - *Neutral*
y>=z      - *Positive*

Paraphrase —650

% of Successful Paraphrases (x)
0<=x<=20   - *Negative*
20<=x<=50  - *Neutral*
x>50       - *Positive*

Overall —660

Count positive (x), negative (y), and neutral (z) Ps
Feedback - max (x, y, z)
P1, P2  - *Negative*
P3, P5  - *Neutral*
P4      - *Positive*

FIG. 6

METHOD AND SYSTEM FOR SPEECH EFFECTIVENESS EVALUATION AND ENHANCEMENT

TECHNICAL FIELD

Aspects of the disclosure are related to quantitative analysis of speech effectiveness and techniques for enhancing speech effectiveness.

BACKGROUND

Many technological organizations have introduced tools for enhancing communication skills for their employees. In particular, organizations have introduced tools for training sales representatives and leaders to help improve their sales pitching skills. These tools have been primarily qualitative in nature. While qualitative and subjective insights have the potential to provide improved learning experiences through demonstrable visual aids, they also can overload the learner with too much information, leading to counteractive deviations from learning goals. With training moving from an offline to an online setting, however, there are no established guidelines on effective tracking and monitoring of performance in environments that support technology-assisted communication and learning.

Furthermore, deficiencies exist with traditional learning techniques. Techniques such as mixed reality (MR), augmented reality (AR) and virtual reality (VR) can serve to helps students to become absorbed in a more interactive environment. With respect to MR, by showing virtual elements alongside real objects, MR creates an immersive hybrid learning environment combining digital and physical objects. Many studies have been conducted to observe the benefits of an MR supported learning environment over typical learning methods. MR can lead to increased motivation, increased attention, increased concentration, higher satisfaction, a faster learning curve, and increased creativity. However, many students find MR, AR, and VR complicated, and that they often face technical problems while using these techniques.

Therefore, a simple training solution is needed for creating a dynamic learning experience, where the effectiveness of communication can be captured and analyzed over time. Furthermore, a solution is needed that will define more objective, standardized measures of learning effectiveness.

SUMMARY

According to embodiments illustrated herein, an automated training system for enhancing conversational effectiveness of a system participant is provided. The system includes an input interface receiving speech input from the system participant and a natural language processor operating on the speech input to produce text. The system additionally includes speech effectiveness analysis processor receiving the speech input and the text as input parameters and producing quantified measures of speech effectiveness based on the input parameters. Embodiments of the system further include a feedback generator receiving the quantified measures, generating personalized feedback based on the quantified measures, and transmitting the personalized feedback to the system participant. Additionally, the system includes a dynamic simulation processor receiving the quantified measures and generating a virtual client dialog based on the quantified measures, wherein the virtual client responds to the speech input using the generated dialog.

In additional illustrative embodiments, an automated training method for enhancing conversational effectiveness of a system participant interacting with a virtual client is provided. The method includes receiving speech input from the system participant at an input interface, operating on the speech input using a natural language processor to produce text, and receiving the speech input and the text as input parameters at a speech effectiveness analysis processor. The method additionally includes producing quantified measures of speech effectiveness based on the input parameters. Embodiments of the method further include generating personalized feedback based on the quantified measures and transmitting the personalized feedback to the system participant. The method further includes and generating a virtual client dialog based on the quantified measures, wherein the virtual client responds to the speech input using the generated dialog.

In yet a further embodiment, a computer program product is provided for use with a computer. The computer program product includes computer readable program code embodied thereon for evaluating and enhancing conversational effectiveness. The computer readable code includes program instructions for operating on speech input that, when executed by a computer perform the method described above.

BRIEF DESCRIPTION OF DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. In a few examples, one element may be designed as multiple elements or multiple elements may be designed as one element. In a few examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which:

FIG. 6 is a table illustrating feedback tabulation of the system in accordance with at least one embodiment.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are for explanatory purposes, as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Embodiments of the invention are directed to a refactorable framework for measuring and enhancing speech or conversational effectiveness of a system participant. One application integrates a sales training environment involving a virtual client, wherein dialog of the virtual client is determined by the effectiveness of the system participant. During the conversations between the system participant and the virtual client, key metrics are captured and aggregated across global measures of effectiveness. These measures influence any interim and final feedback provided to the system participant. Additionally. The system defines conversational intensity flow based on the performance of the system participant in order to influence dynamic adaptation of the virtual client based on the quantitative measures.

Figure 1:
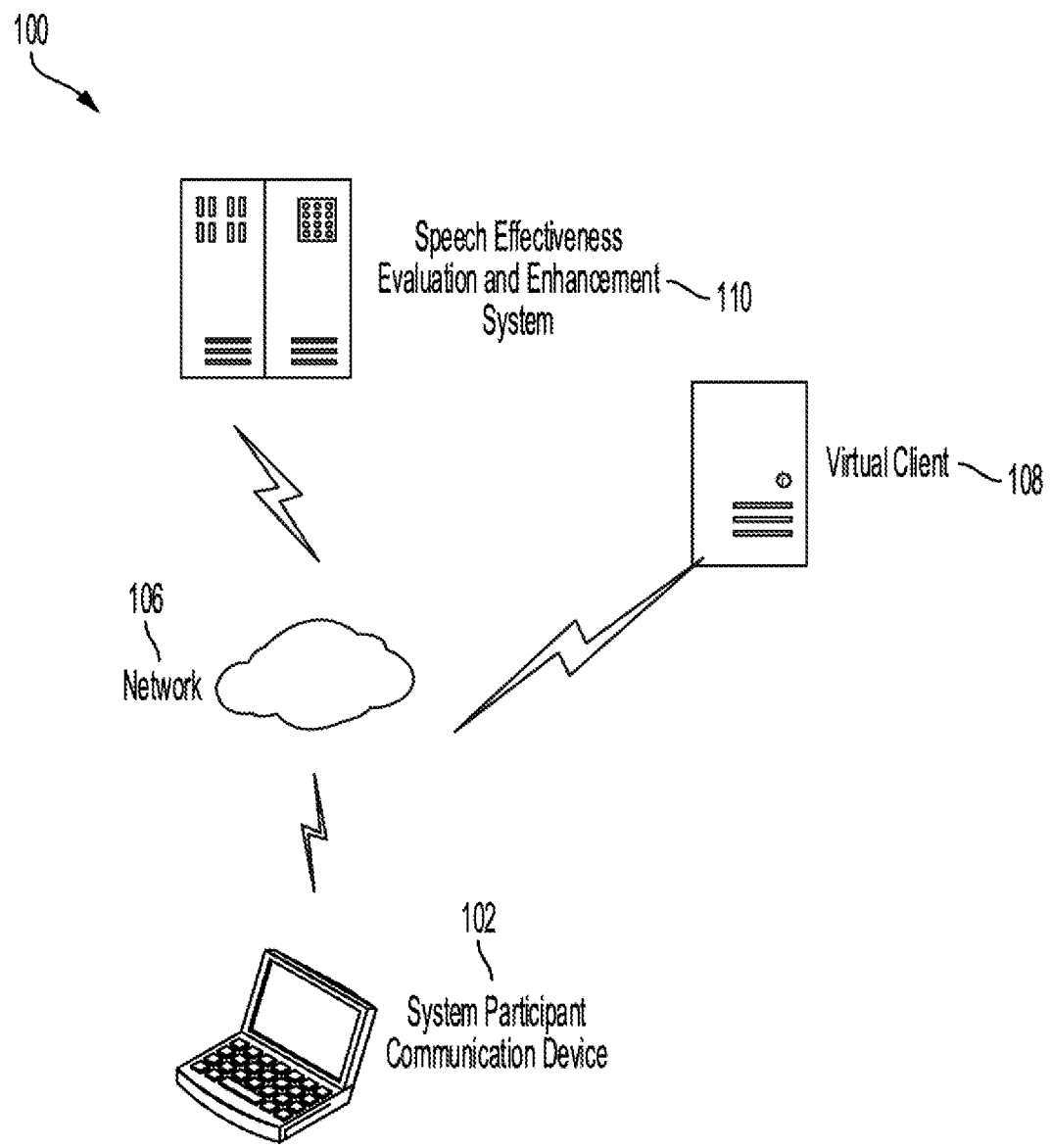
FIG. 1 is a block diagram illustrating an operating environment for a system for evaluating and enhancing speech or conversational effectiveness in accordance with at least one embodiment.

FIG. 1 is a block diagram illustrating an operating environment 100 for a system for evaluating and enhancing conversational effectiveness in accordance with at least one embodiment. A speech effectiveness evaluation and enhancement system 110 is connected over a network 106 with a participant system 102. A virtual client 108 controlled by the speech effectiveness evaluation and enhancement system 110 is connected over the network 106 with the speech effectiveness evaluation and enhancement system 110 and the participant system 102.

The participant system 102 may be operated by an individual seeking to evaluate and enhance his or her conversational and speech effectiveness. The participant system 102 may be or include a computing device such a laptop or desktop computer, a tablet, a personal digital assistant (PDA), or a mobile phone, but may also be a virtual reality (VR) device, such as a VR headset. In additional embodiments, the participant system 102 may include a mixed reality (MR) device or an augmented reality (AR) device that enables the system participant to be fully or partially immersed in a virtual training environment interacting with the speech effectiveness evaluation and enhancement system 110.

The network 106 may include a wired or wireless local area network (LAN) and a wide area network (WAN), wireless personal area network (PAN) and other types of networks. Although only one network is shown, the computers may be connected over multiple disparate networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The speech effectiveness evaluation and enhancement system 110 includes a computing system implementing a refactorable framework to measure conversational and speech effectiveness. In embodiments of the invention, the system operates in a sales training environment, such that participants operate the participant systems 102 to interact with the speech effectiveness evaluation and enhancement system 110 to evaluate and improve sales effectiveness. The speech effectiveness evaluation and enhancement system 110 is further illustrated in FIG. 2 and as will be described below, operates to engage system participants in an exercise and receives participant input, analyzes the input, and provides feedback based on the analysis. Further, the speech effectiveness evaluation and enhancement system 110 generates and controls the virtual client 108.

Although shown as a separate entity, the virtual client 108 may be integrated with the speech effectiveness evaluation and enhancement system 110. The speech effectiveness evaluation and enhancement system 110 generates the virtual client 108 dynamically by manipulating stored computer code based on the analysis of input participant speech. Thus, participant speech may cause selection of one or more of multiple virtual client scripts, thus illustrating how a conversation may be altered based on effectiveness of participant speech. In operation, the participant system 102 may generate a visual representation of the virtual client 108 as well as the dynamic dialog, both of which are presented to the participant on the participant system 102. Initial generation of the virtual client 108 may be based on selection of a training exercise selected from multiple available stored training exercises.

Figure 2:
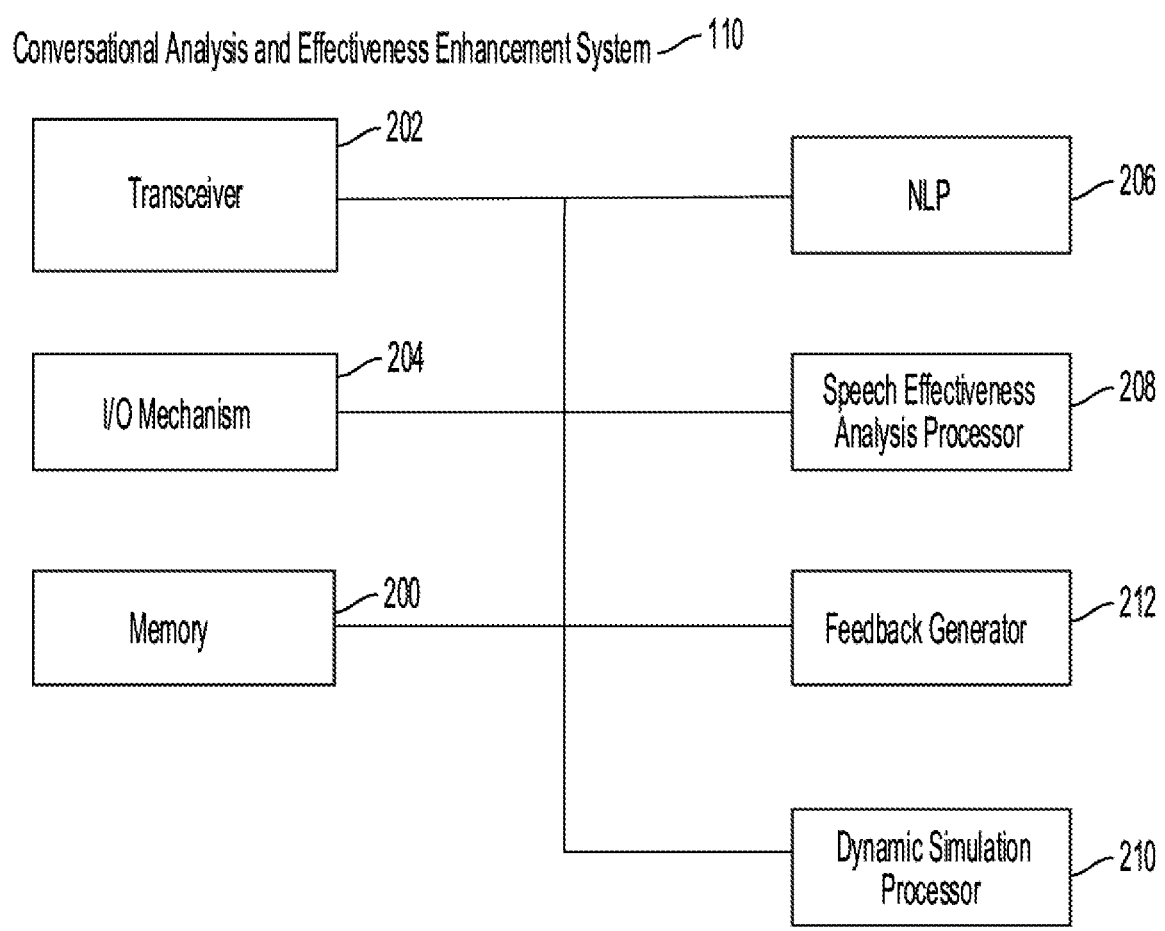
FIG. 2 is a block diagram illustrating a system for evaluating and enhancing speech or conversational effectiveness in accordance with at least one embodiment.

FIG. 2 is a block diagram illustrating the system 110 for evaluating and enhancing conversational effectiveness in accordance with at least one embodiment. The embodiment of the system as shown includes a memory 200, a transceiver 202 input/output (I/O) mechanisms 204, a natural language processor (NLP) 206, a speech effectiveness analysis processor 208, a dynamic simulation processor 210, and a feedback generator 212.

The memory 200 is configured to store the set of instructions or modules. Some of the commonly known memory implementations can be, but are not limited to, a Random-Access Memory (RAM), a Read-Only Memory (ROM), a Hard Disk Drive (HDD), and a secure digital (SD) card. The memory 200 may include a program module and program data. The program module includes a set of instructions that can be executed by the processors to perform specific actions on the system 110. The data may be stored in various databases present in the memory 200 that are accessible to the processors executing the stored programs. Databases stored in the memory 200 can be implemented by using several technologies that are well known to those skilled in the art. Some examples of technologies may include, but are not limited to, MySQL® and Microsoft SQL®. In an embodiment, the databases may be implemented as cloud storage. Examples of cloud storage may include, but are not limited to, Amazon E3® and Hadoop® distributed file system. The memory 200 stores a conversational effectiveness framework and data necessary for implementing the conversational effectiveness framework. The memory 200 may also store databases including an utterance log and ideal learner responses that will be further described below with reference to FIG. 3.

The transceiver 202 may include logic, circuitry, interface, and/or code operable to communicate with one or more devices, such as the participant system 102 or any other devices that may be included in the environment 100. The transceiver 202 may implement one or more known technologies to support wired or wireless communication with the communication network 106. In embodiments of the invention, the transceiver 202 may be coupled to the I/O mechanism 204 through which the transceiver may receive or transmit instructions, queries, speech signals or other information. The transceiver 202 may include, but is not limited to, an antenna, a radio frequency (RF) transceiver, one or more amplifiers, a tuner, one or more oscillators, a digital signal processor, a universal serial bus (USB) device, a coder-decoder (CODEC) chipset, a subscriber identity module (SIM) card, and/or a local buffer. The transceiver 202 may communicate via wireless communication with networks such as the Internet, an Intranet and/or wireless network, such as a cellular telephone network, a wireless local area network (LAN) and/or a metropolitan network (MAN).

The I/O mechanism 204 may include multiple mechanisms for receiving speech input and generating both speech output and other types of feedback reviewable by the system participant utilizing the participant system 102. The I/O mechanism 204 may comprise suitable logic, circuitry, interfaces, and/or code that may be configured to transmit or receive a speech signal or other information to and from devices such as the participant system 102 over the network 106. The I/O mechanism 204 may be configured to communicate with the transceiver 202 and may be connected to the communication network 106 through the transceiver 202. The I/O unit 204 may further include an input terminal and an output terminal that may be realized through an antenna, and Ethernet port, a USB port, or any other type of port that may be configured to receive and transmit data. The I/O unit 204 may include, but is not limited to, a keyboard, a mouse, a joystick, a touch screen, a touch pad, a microphone, a camera, a motion sensor, and/or a light sensor. Further, the I/O mechanism 204 may include a display screen realized using suitable logic, circuitry, code, and/or interfaces that may be operable to display output. The display screen may be or include but is not limited to a liquid crystal display (LCD) display, light emitting diode (LED) display, or an organic LED (OLED) display.

The NLP 206 operates on input speech to derive syntax capable of analysis. The NLP 206 is connected with the I/O mechanism 204 and operates on captured speech to perform an audio to text conversion. The NLP 206 may then process the text data. In order to accomplish the processing, the NLP 206 utilizes algorithms to identify and extract rules such that the unstructured data can be converted to text analyzed. For example, the NLP 206 may perform speech recognition, speech segmentation, sentiment analysis, topic segmentation and recognition, word sense disambiguation, and any other operations necessary to facilitate the analysis necessary for utilizing the framework described herein. The NLP 206 may include suitable logic, circuitry, and/or code that may be configured to execute instructions stored in the memory 200. The NLP 206 may be implemented based on a number of processor technologies that include, but are not limited to an X-86 based processor, a reduced instruction set computing (RISC) processor, an application-specific integrated circuit (ASIC) processor, a couples set computing (CISC) processor, a microprocessor, a microcontroller, or other suitable structures. Code integrated with the NLP 206 may include python source code or another suitable type of code.

The speech effectiveness analysis processor 208 includes stored instructions for evaluating the processed speech output by NLP 206 based on a stored framework across multiple measures of effectiveness. The speech effectiveness analysis processor 208 may also operate on unprocessed speech received through the transceiver 202 and/or I/O mechanism 204 to analyze factors such as loudness, pitch, and pause as will be further described below. The speech effectiveness analysis processor 208 produces quantitative measures that impact both interim and final feedback presented to the system participant. As will further be explained in relation to FIGS. 3-6, the speech effectiveness analysis processor 208 captures measures including pause, pivot, passion, probe, and paraphrase and combines these measures in order to evaluate effectiveness and facilitate feedback generation. The speech effectiveness analysis processor 208 may implement known processing hardware as described above and utilize code that defines the framework as set forth below with respect to FIGS. 3-7.

The dynamic simulation processor 210 operates on the output of the speech analysis engine 208 select stored scripts to control and generate the virtual client 108. The effectiveness of the analyzed speech impacts the interaction of the virtual client 108 with the system participant through the participant system 102, thereby creating a dynamic learning environment for the system participant. In embodiments of the invention, the dynamic simulation processor 210 utilizes code stored in the memory 200 in order to generate training sessions and dynamically modify those training sessions based on output of the speech analysis engine 208. Any one of multiple initial training session scripts stored in the memory 200 may be selected by the dynamic simulation processor 210. In embodiments of the invention the dynamic simulation processor 210 interacts with the I/O mechanism 204 in order to receive a request for a training session selected from multiple available training sessions and extracts and runs the selected training session code. Each training session may start with a fixed script. However, after each interactive segment of the training session in which speech is received from the participant system 102, the speech effectiveness analysis processor 208 sends output to the dynamic simulation processor 210 in order to allow the dynamic simulation processor to selectively modify the next segment of the training session based on participant performance. The dynamic modification controls the behavior and interactive properties of the virtual client 108 based on the quantified performance of the system participant.

The feedback generator 212 operates on output from the speech analysis engine 208 in order to produce both interim feedback to the system participant during a training exercise and final feedback to the system participant after the conclusion of a training exercise. Additionally, feedback may be provided to the system participant at various steps. However, in embodiments of the invention, the feedback generator 212 operates on the output of the speech effectiveness analysis processor 208 after every spoken sentence, but feedback is held back so as to not increase the cognitive load of the system participant. In this embodiment, the feedback generator 212 provides global feedback, which tells the system participants about their overall performances and where they did well and where they can improve. The feedback is created in such a manner that encourages the system participants to continuously learn and motivates them even after a poor performance.

Each of the processors described above can be utilized to implement multiple discrete software modules performing each of the functions described herein. Processors can be realized through a number of processor technologies known in the art. Examples of the processor can be an X86 processor, a RISC processor, an ASIC processor, a CISC processor, or any other processor. Furthermore, although a single memory structure is shown, multiple memory structures may be included. Multiple processors are shown but can be combined into fewer processors if desired. The processors are configured to execute sets of instructions stored in the memory 200. The processors gather the sets of instructions from the memory and execute the sets of instructions.

Figure 3:
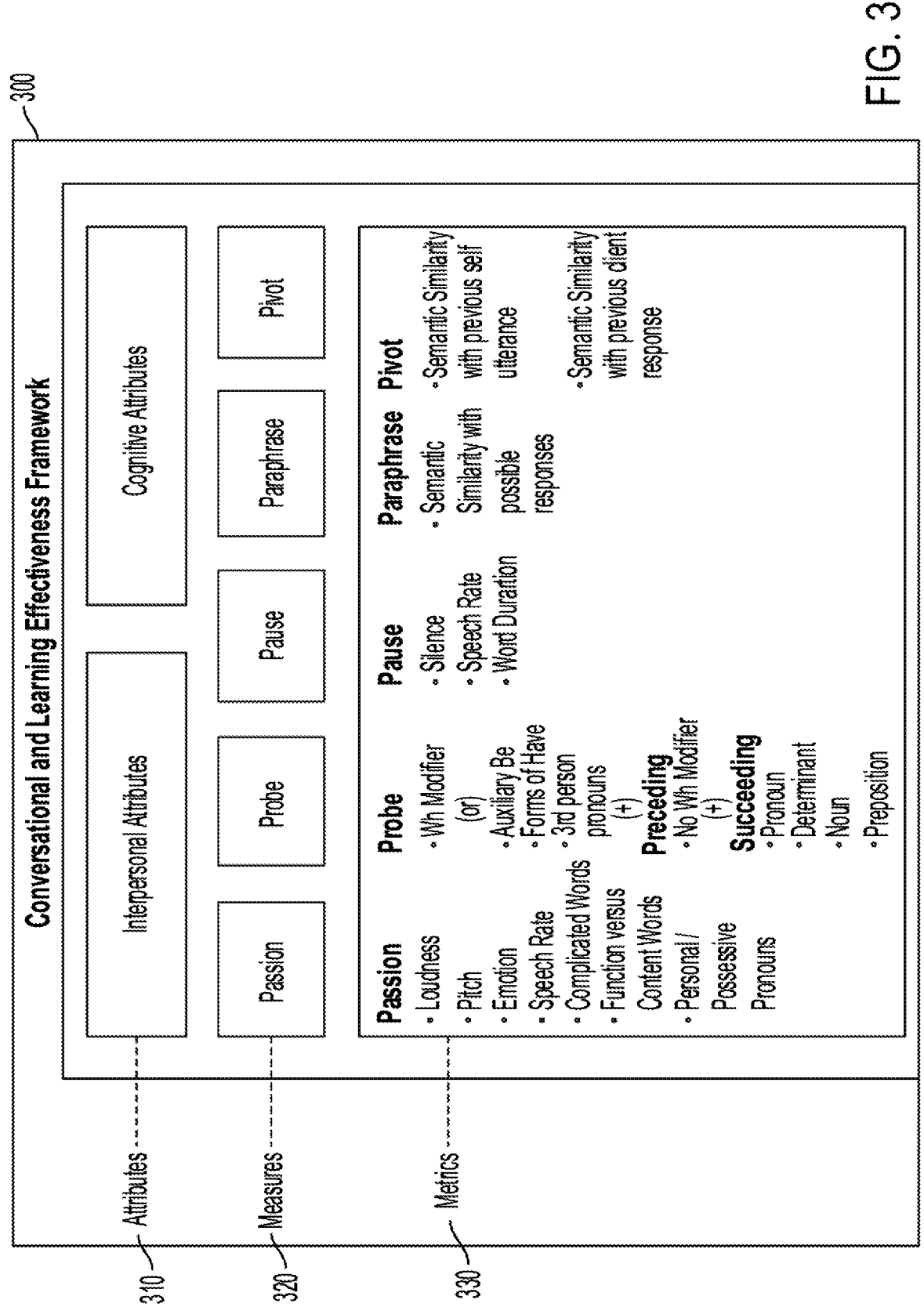
FIG. 3 is a block diagram illustrating a learning effectiveness framework in accordance with at least one embodiment.

FIG. 3 is a block diagram illustrating a learning effectiveness framework 300 in accordance with at least one embodiment. The learning effectiveness framework may be stored in the memory 200 and may be utilized by the speech effectiveness analysis processor 208. The conversational and learning effectiveness framework consists of three key constituents including attributes 310, measures, 320, and metrics 330.

The attributes 310 are high level characteristics and qualities that serve as the overall goals to be achieved by individuals. As illustrated, the attributes 310 include interpersonal and cognitive attributes. The interpersonal attributes define inherent qualities and personality traits that an individual exhibits in normal conversation, and inadvertently, in sales conversations. These attributes are typically innately reflected in the way individuals interact and need not always be consciously reinforced. Examples of interpersonal attributes that are relevant to the stored framework include: reliability; trustworthiness; optimism; openness; persistence; cooperation; assertiveness; and extrovertedness.

The cognitive attributes emphasize perceptual, social, learning, rationalizing, and decision-making abilities of the system participant. The cognitive attributes are not always instinctive and rely on past knowledge and experiences to shape an interaction. The cognitive attributes may require emulation on certain occasions and restraint during others. The following cognitive attributes are relevant to this framework: analytic ability; adaptiveness; awareness; creativity; empathy; pragmatism; attentiveness; and anecdotal ability.

While attributes 310 define the principles and qualities of a good salesperson, or in other applications, a skilled conversationalist, these attributes are not necessarily detectable directly. Moreover, individual understanding and assessment of these attributes can be vastly different and ambiguous. Hence, it is necessary to define measures of such attributes. These measures provide a strong sense of specificity, that, when assessed in a standardized fashion, can help characterize the attributes 310 that the learner exhibits. In order to define a specificity for these measures, embodiments of the invention define metrics that introduce objectivity and specific, measurable changes in the learner's behaviour and actions.

The measures 320 define specific qualities or parameters of attributes that can help define these attributes. A measure can be composed of one or more attributes. In the context of conversations and their associated sales learning aptitude, the measures described below are evaluated.

The first measure, passion, is a bedrock of an effective sales pitch. Passion conveys the interest and willingness of the system participant to provide the best possible solution to resolve the virtual client queries. Passion also conveys confidence in a product that the system participant pitches and the expertise of the system participant in identifying the right fit for the virtual client. Passion is key to conveying that a salesperson is intent on making an impact in the client environment.

A second measure, probe, can be viewed as a key to unlocking avenues for collaboration. Probing enables the system participant to learn more about wants and needs of the virtual client and enables the system participant to shape the conversation to obtain the most effective sale. Probing provides a privy view of the virtual client limitations, constraints, wants, and decision-making criteria. Probing can be extremely useful to get more insights about client concerns and enable the system participant to pitch the product to address these concerns. Probing provides enrichment to personality-based and problem-based relationship development in conversations.

A third measure, pause, is an indicator of reflection and listening. Pauses are vital to every conversation, and even more so in sales pitches, where both the system participant and the virtual client need to contemplate and evaluate whether a sale should be made. Pauses that are well timed enable salespersons to comprehend the client concerns and answer effectively.

A fourth measure, paraphrase, signifies an intent to empathize. Paraphrases can help the virtual or real client know that the salesperson is on the same page and can also provide space for clarification and reinforcement of ideas. Paraphrases, also dubbed as verification questions, enable salespersons to validate their assumptions about client needs and appropriate solutions stemming from previous knowledge A fifth measure, pivot, calls for re-alignment of the pitch to the real or virtual client. When a conversation is perceived to be headed in the wrong direction, for example, when the client is focusing on specific challenges that the system participant cannot address, it is important for the system participant to steer the conversation by pivoting to a feature or tangent not previously discussed. Pivoting in the right direction becomes even more vital in such scenarios. Pivoting at the right moment can save a lot of effort and prevent a sale pitch from ending badly.

While all these attributes are essential to gauge the performance of a salesperson, without quantification, the measures 320 remain subjective. The metrics 330 are variables that bring objectivity to the measures and help quantify these measures. The metrics are extracted from text, haptic, and vocal sources. For each measure, a distinct set of metrics has been identified to adhere to the quantification.

For the passion measure, the system collects and evaluates multiple metrics. A first metric for quantitative measurement is loudness. Louder voices exhibit greater confidence than softer voices, so long as they are within a definable threshold below an unpleasant level. Additionally, variability in loudness can also be measured and can reflect more passion. A second metric for measurement is pitch.

Different vocal frequencies and pitches are associated with different emotions, and these pitch ranges can also vary vastly based on demographic attributes such as gender. A third metric for quantification of passion is emotion. While passion can entail a spectrum of emotions, the system is focused on finding emotions that are positive and reinforce productive conversations. Therefore, the system quantifies emotions that can exhibit happiness and awe. A fourth metric for quantification is speech rate. An ease of listening is associated with any conversation. While the speech rate can inherently vary per individual, a general consensus around the speech rate for various scenarios illustrates the need for capturing the intent of the conversation to moderate this rate. A fifth metric for measurement of passion includes complicated words. Passionate speakers tend to use more complicated words, as this reflects on their fluency and confidence. A complicated word is marked by an increased number of syllables in its construction. A sixth metric for quantification is the identification of function versus content words. The increase in relative content as opposed to specific content can increase charisma of a conversation. Hence obtaining a higher function to content word ratio is desirable to exhibit more passion. A seventh metric for quantifying passion involves identification of personal and/or possessive pronouns. Passion is also associated with a high level of inclusiveness and empathy. Hence, the usage of personal and possessive pronouns is beneficial, in moderation, to reflect more passion.

To quantify the probe measure, metrics of open endedness and closed endedness are quantified. An open-ended probe is one that elicits a verbose response from the virtual client. Examples of open-ended probes utilize 'what', 'why', or 'how'. A closed ended probe still qualifies as probe, but it is not necessarily beneficial to ask questions that elicit brief or curt responses. Closed ended probes are not as effective for gaining insight into client needs. For example, closed ended probes use phraseology such as: 'is', 'does', 'do', 'are', 'should', 'could', 'have', 'do', 'when', and 'can'.

In order to quantify the pause measure, multiple metrics are evaluated. A first quantified metric is silence. The right amount of silence can reflect on the system participant's ability to comprehend and accommodate the virtual client's needs. Silence is determined by truncating preceding and succeeding noise and subtracting the cumulative word durations from the audio duration. A second metric for quantifying the pause measure is speech rate. Speech rate is an auxiliary attribute that provides a baseline metric for understanding the speech of the speech and relative silence. A third metric for quantifying the pause measure is word duration. Word duration measures the total utterance time for each word that feeds into the evaluation of silence.

In order to quantify the paraphrase measure, a semantic similarity metric with possible responses is evaluated. Measuring how similar the system participant's utterance is with the scripted or available choices for responses that can lead the conversation into multiple routes including a positive route, a negative route, and a neutral route provides valuable insight.

For the pivot measure, semantic similarity with previous self-responses is measured. If the system participant's response is less similar to what the participant has said in the previous interaction instance, then a self-pivot is said to have occurred. Additionally, semantic similarity with previous client responses is measured. If a system participant has a response that is less similar to the most recent response received from the client, then a client pivot is said to have occurred, and is often preferable to a self-pivot.

An attribute to measures mapping that helps infer which attributes can be associated with a system participant may be stored in the memory 200. This proposed mapping between attributes to their corresponding measures of evaluation helps infer which attributes can be associated with a learner given the right measure of passion. This can guide a system participant to tie in behaviors with the overall qualities that are emanated to the client. The following rubric provides an effective mapping between the measures and their corresponding interpersonal and cognitive attributes:

TABLE 1

Mapping Measures of the Framework to corresponding Interpersonal and Cognitive Attributes

| Measures | Interpersonal Attributes | Cognitive Attributes |
| --- | --- | --- |
| Passion | Optimistic, Extroverted, Assertive | Empathetic, Anecdotal, Creative |
| Probe | Trustworthy, Open, Extroverted | Aware, Creative, Empathetic |
| Pause | Open, Collaborative, Trustworthy | Analytical, Adaptive, Aware |
| Paraphrase | Cooperative, Open, Persistent | Anecdotal, Attentive, Analytical |
| Pivot | Reliable, Persistent, Assertive | Adaptive, Attentive, Pragmatic |

Figure 4:
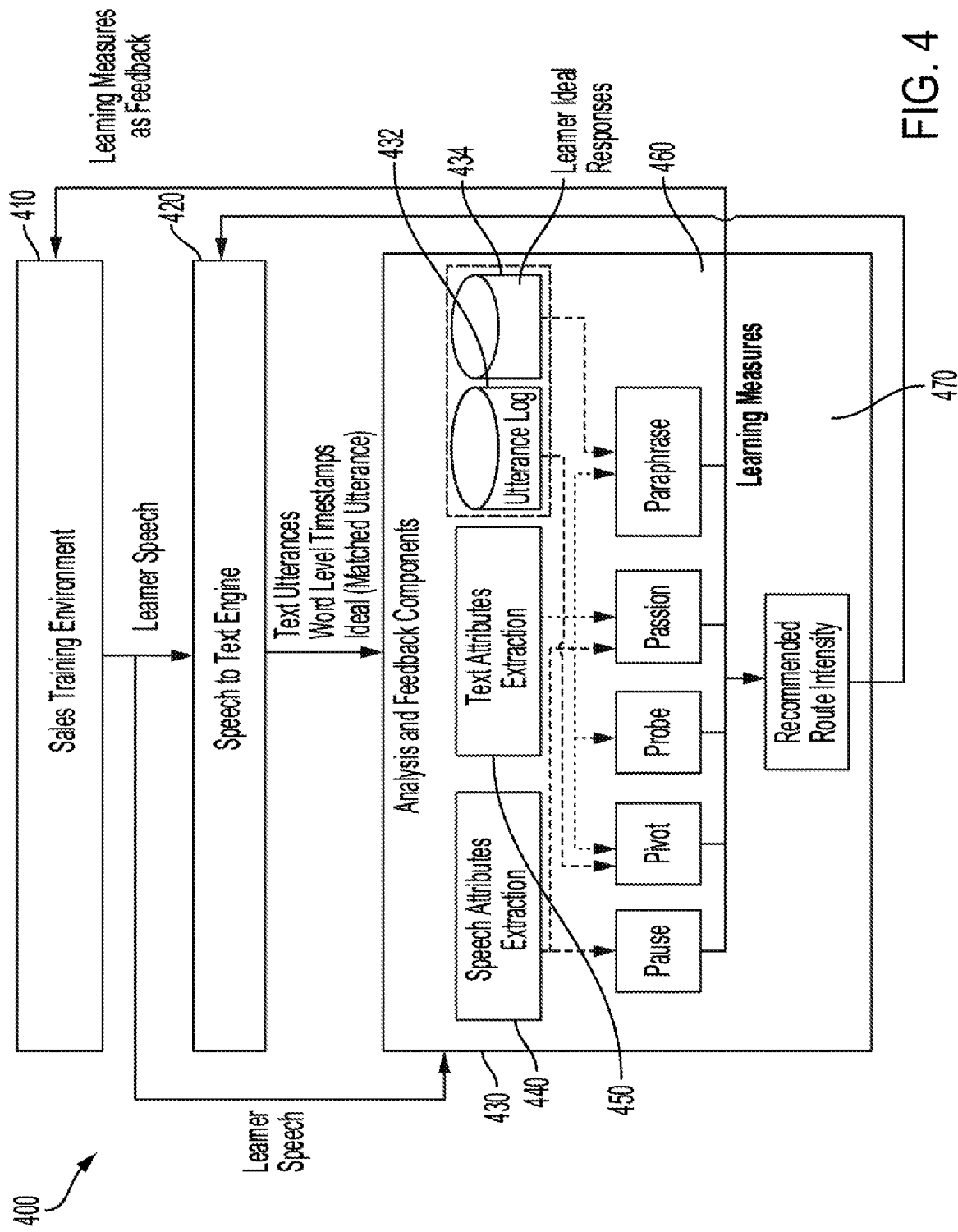
FIG. 4 is a workflow diagram illustrating operation of the learning effectiveness framework in accordance with at least one embodiment.

FIG. 4 is a workflow diagram illustrating utilization of the learning effectiveness framework explained with respect to FIG. 3 by the system of FIG. 2 in accordance with at least one embodiment. A sales training environment 410 is created for the system participant. This sales training environment may be viewed on a participant system, which may, for example, be a VR, MR, or AR viewing device. The sales training environment may be produced by the dynamic simulation processor as described above. Thus, a given sales training environment 410 captures each participant instance.

Participant speech from the sales training environment 410 arrives at the speech to text engine 420 of the NLP. The speech to text engine 420 extracts text utterances, word level timestamps and ideal (matched utterances) from the system memory and sends them to analysis and feedback components 430 (corresponding to the speech effectiveness processor 208 and the feedback generator 212 of FIG. 2). Thus, upon receiving speech input from the sales training environment 410, the text engine 420 operate on the speech to produce text in a manner that enables analysis. Further, the speech is also sent directly from the training environment 410 to the analysis and feedback components 430 in order to enable analysis of both the speech and the text. Thus, each instance is passed through a speech-to-text engine 420 that provides the transcript and word level timestamps for the participant's utterance. In addition, the speech to text engine 420 also provides a sense of the matched intent.

This data is passed to the analysis components 430 that extract speech attributes 440 and text attributes 450 that are mapped to each of the five metrics discussed above and illustrated at 460. As illustrated, additional context is provided through an utterance log 432 that contains previous client and participant conversations sorted by utterance. In addition, a repository of ideal or scripted participant response choices 434 can be retrieved to ascertain the alignment of the current utterance to the conversational journey branched.

Each of the five metrics is computed and each metric provides a recommended route intensity as will be further explained below with respect to FIGS. 5A-5E. These recommendations are weighted to derive an overall route intensity recommendation for that utterance. In addition, individual metrics of learning are captured and aggregated to provide interim and global feedback towards the end of a conversation in the training environment 410.

Figure 5A:
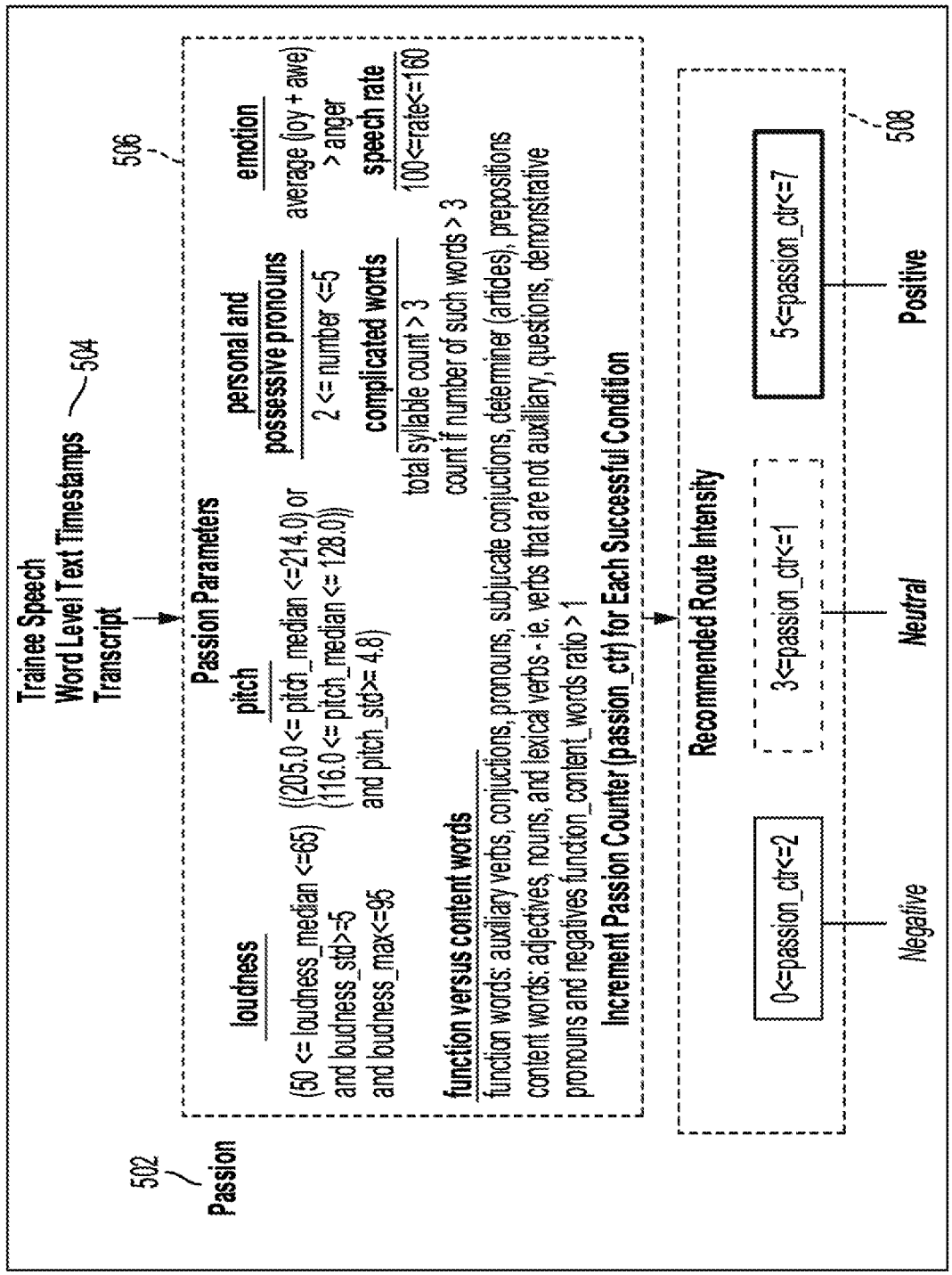
FIG. 5A is a flowchart illustrating quantification of a passion measure of the learning effectiveness framework in accordance with at least one embodiment.

FIG. 5A is a flowchart illustrating computation of a passion metric 502 of the learning effectiveness framework in accordance with at least one embodiment. Speech, word level test timestamps, and a transcript are input from the NLP at 504. Values for the metrics of the passion measure described above are computed at 506. In the illustrated embodiment, passion is assessed on a scale of 0 to 7. Each metric, including loudness, pitch, personal and possessive pronouns, complicated words, emotion, speech rate, and function versus content words contributes to one point for the overall passion counter. The values of the counter may be provided as feedback in the sales training environment. If the counter lies between 0 and 2, then the recommended route intensity is negative. If it lies between 3 and 4, then recommended route intensity is neutral, and between 5 and 7 leads to a positive recommendation.

The passion counter is increased by one point for each of the identified conditions. For loudness, if the median loudness is between 50 and 65 dB, the standard deviation is greater than or equal to 5 and the maximum loudness is less than or equal to 95, the passion counter is increased by one point. For pitch, if the median pitch is between 205 to 214 Hz for females or between 116 and 128 Hz for males, and the standard deviation of the pitch is greater than or equal to 4.8, the passion counter is increased by one point. For personal and possessive pronouns, if there are between two and five personal or possessive pronouns in an utterance, the passion counter is increased by one. For emotion, if the average presence of joy and awe in the words used is more than the anger conveyed, the passion counter is increased by one. For complicated words, if there are more than three words that contain three or more syllables, the passion counter is increased by one. For speech rate, if the number of words per minute is between 100 and 160, the passion counter is increased by one. For function versus content words, if the ratio of function words to content words is greater than one, the passion counter is increased by one. As an output, the system provides a recommended route intensity is provided at 508. The recommended route intensity may be negative, neutral, or positive.

Figure 5B:
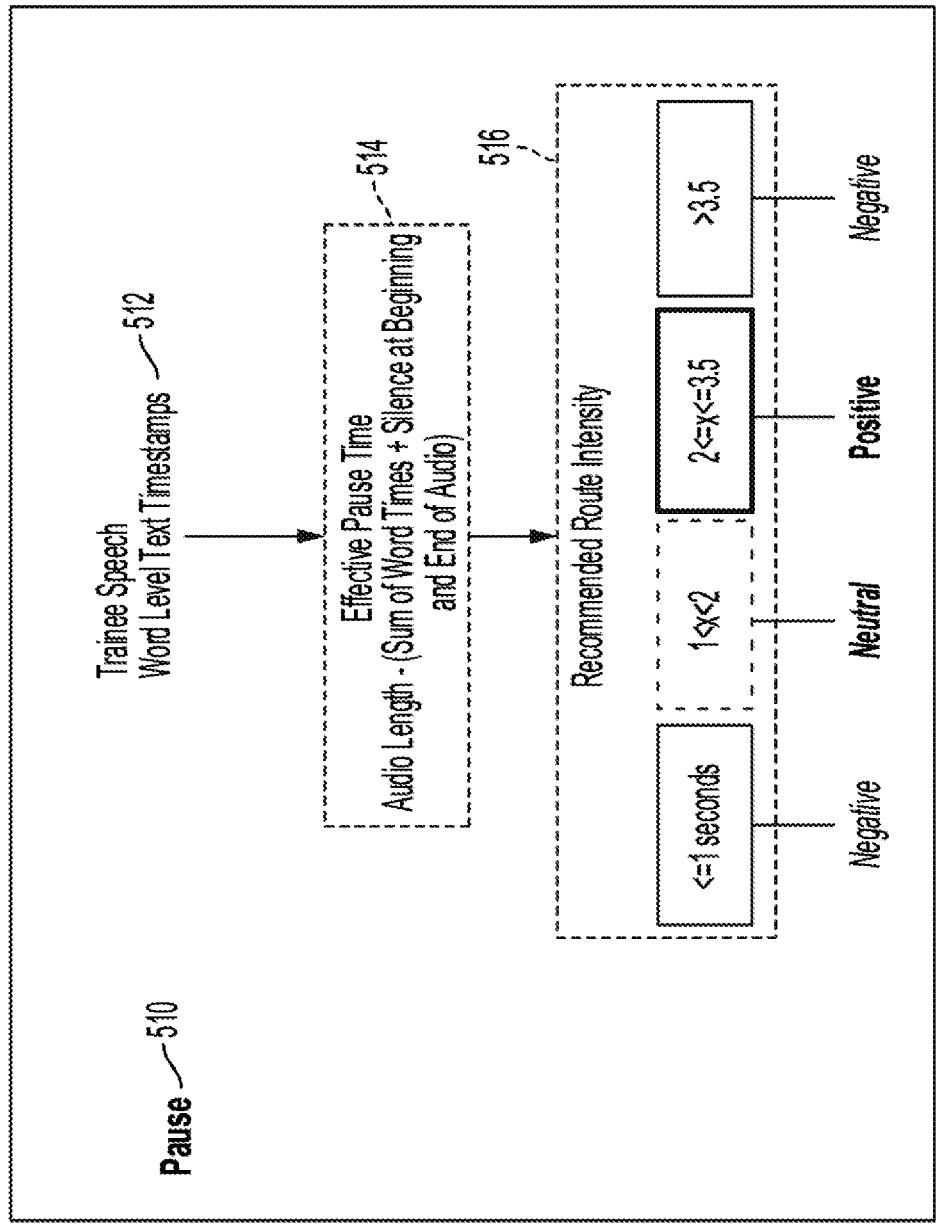
FIG. 5B is a flowchart illustrating quantification of a pause measure of the learning effectiveness framework in accordance with an embodiment of the invention.

FIG. 5B is a flowchart illustrating a pause metric 510 of the learning effectiveness framework in accordance with an embodiment of the invention. Input 512 is operated on to determine effective pause time 514. The effective pause time is captured by truncating silence from the beginning and end of the audio and obtaining between-word silences. Evaluation of pause time leads to a recommended route intensity of negative, neutral, or positive at step 516. If this pause time is one second or less, then the recommended route intensity is negative. If the pause time is between one and two seconds, the recommended route intensity is negative. If the pause time is between two and three and a half seconds, the recommended route intensity is positive. However, if the pause time exceeds three and a half seconds, the recommended route intensity is construed as negative.

Figure 5C:
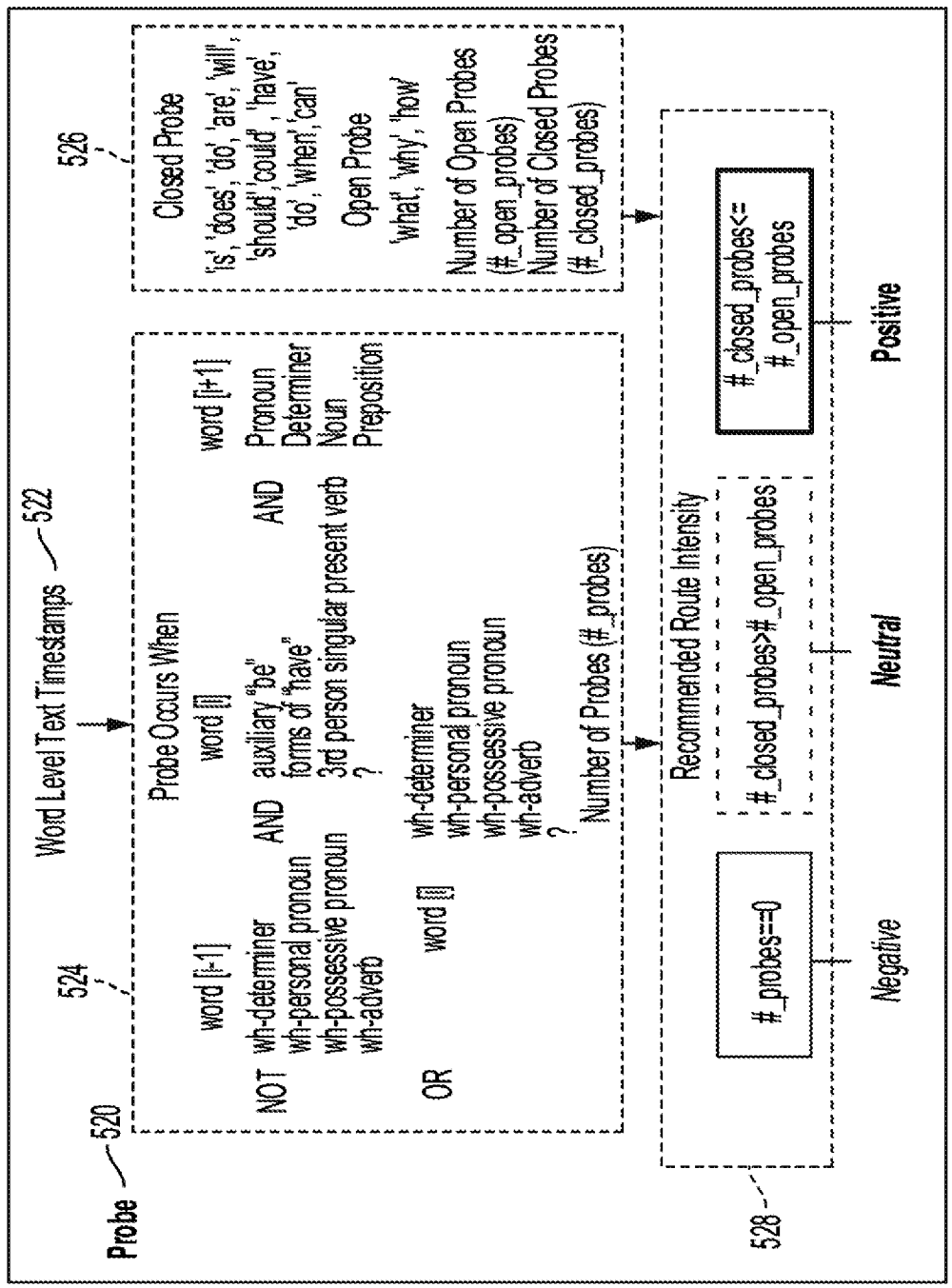
FIG. 5C is a flowchart illustrating quantification of a probe measure of the learning effectiveness framework in accordance with an embodiment of the invention.

FIG. 5C is a flowchart illustrating computation of a probe measure 520 of the learning effectiveness framework in accordance with an embodiment of the invention. The NLP sends word level text timestamps at 522. Analysis of the speech effectiveness analysis and enhancement engine at 524 determines if a probe has occurred by determining if an utterance contains one of the following cases: (1) A question mark (?); (2) Wh Modifier [What, Who, Where, etc]; (3) Auxiliary forms of Be with no preceding Wh Modifier (like What, Who etc.) or with a succeeding ronoun, determinant, noun or preposition; (4) forms of Have with no preceding Wh Modifier (like What, Who etc.) or with a succeeding pronoun, determinant, noun or preposition; or (5) third person pronouns with no preceding Wh Modifier (like What, Who etc.) or with a succeeding pronoun, determinant, noun or preposition.

If the analysis at 524 determines that a probe is present, further analysis at 526 determines the type of probe, i.e., whether a probe is closed or open. The number of open and closed probes is evaluated. If there are no probes to begin with, the recommended route intensity is computed as negative at step 528. If there are more closed probes than open probes, a neutral route intensity is recommended, and if there are more open probes, then a positive route intensity is recommended.

Figure 5D:
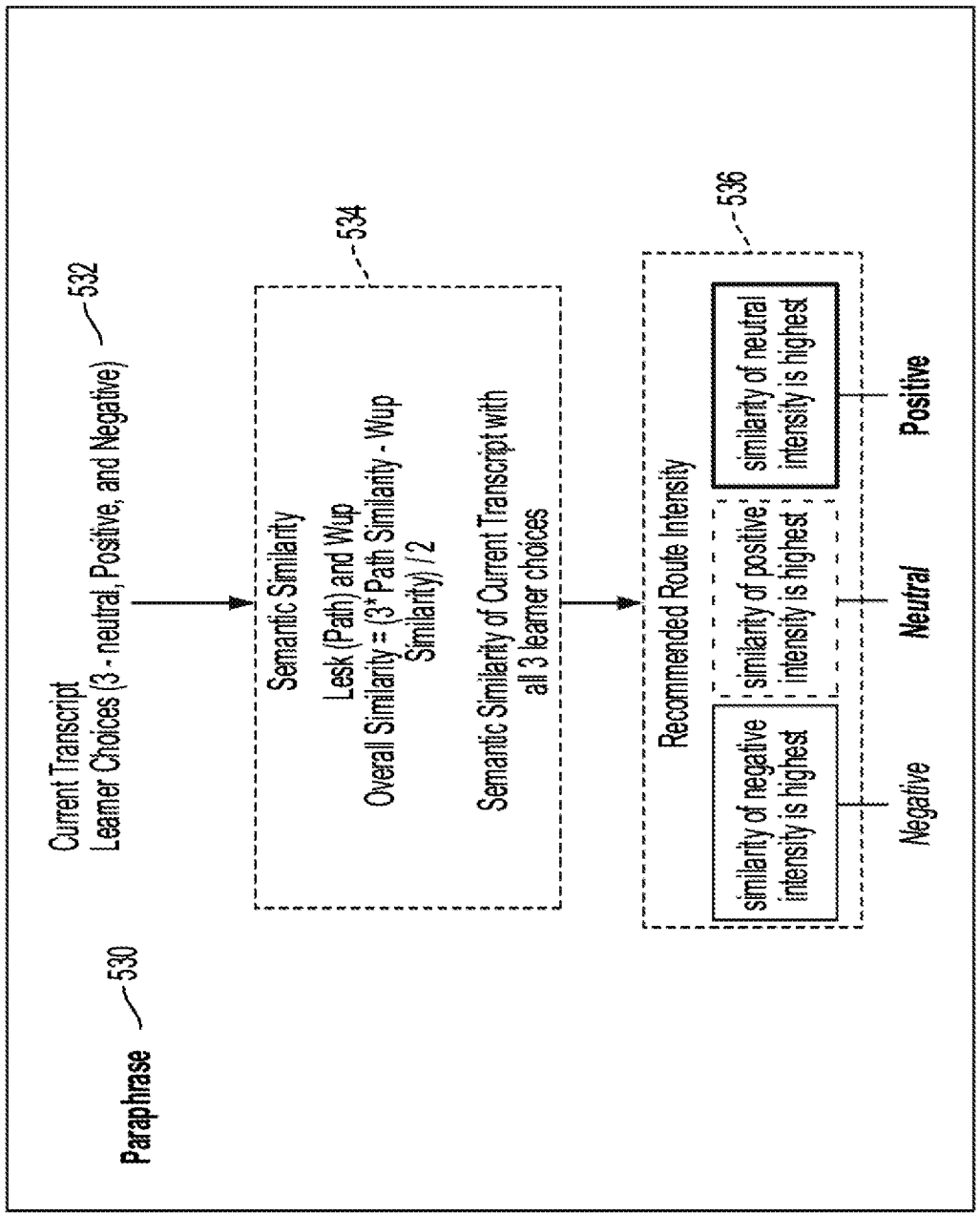
FIG. 5D is a flowchart illustrating quantification of a paraphrase measure of the learning effectiveness framework in accordance with an embodiment of the invention.

FIG. 5D is a flowchart illustrating computation of metrics to quantify the paraphrase measure 530 of the learning effectiveness framework in accordance with an embodiment of the invention. The speech effectiveness analysis processor receives input from the NLP including a current transcript with participant choices. To determine whether the participant has done a good job of paraphrasing what was intended, the semantic similarity of the utterance is compared at step 534 to those of the available routes that have an ascertained intensity of the journey. Step 534 moves beyond lexical methods that capture a word-to-word similarity and instead focuses on the semantics, or meaning, of the utterance. The recommended route intensity is reflected based on the choice that has the highest similarity, i.e., the choice that is the closest paraphrase of the utterance. In an embodiment of the invention, to evaluate the semantic similarity for each utterance-choice pair, a combination of Lesk and Wup similarity measures are used. The Lesk similarity measure is a classical algorithm for word sense disambiguation and the Wup (Wu & Palmer similarity) calculates relatedness by considering the depths of the tow synsets in the WordNet taxonomies along with the depth of the least common subsumer. Thus, the Lesk similarity is adapted to find a sense that closely matches the sentence while Wup similarity captures the distance between synsets by mapping them to a taxonomic hierarchy. The final similarity is captured through a weighing of both the Lesk and Wup similarities as (3*Lesk–Wup)/2. Based on this value, the route associated with the pair that has the highest similarity is recommended in step 536.

Figure 5E:
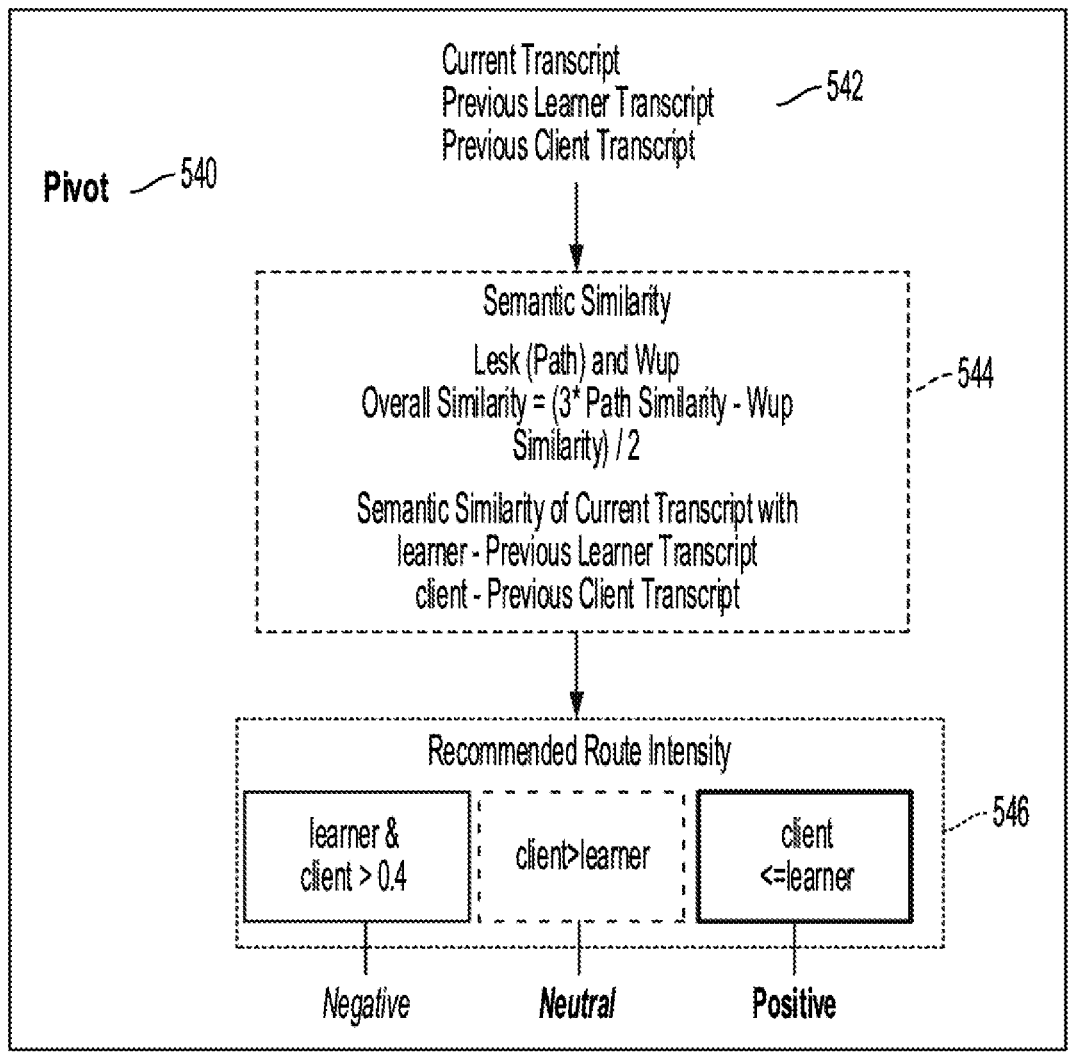
FIG. 5E is a flowchart illustrating quantification of a pivot measure of the learning effectiveness framework in accordance with an embodiment of the invention.

FIG. 5E is a flowchart illustrating computation of the pivot measure 540 of the learning effectiveness framework in accordance with an embodiment of the invention. The speech effectiveness analysis and enhancement engine receives input at step 542 including a current transcript, a previous participant transcript, and a previous virtual client transcript. In embodiments of the invention, inputs can be retrieved from the computer memory. In case of pivots, a goal is to identify whether the conversation was steered in a different direction in order to stay on the path of making a sale. Such steering away can be from what the participant herself said in a preceding instance, or from what the participant just heard from the client. The system captures how much the conversation changed course. While the algorithmic construct is similar to paraphrasing where Lesk and Wup similarity are used in a weighted fashion, the context is to determine how dissimilar the values are. The two pairs that are evaluated with respect to a participant's current utterance are the participant's previous utterance, and the virtual client's previous utterance. If the calculated semantic similarity at step 544 for either of the pairs is greater than 0.4, then a negative route intensity is recommended at step 546. If the client similarity is greater than the participant similarity, this means that a self-pivot has occurred, leading to a neutral route intensity recommendation at step 546. Otherwise, if the participant similarity is greater than the virtual client similarity, this indicates a client pivot, leading to a positive route intensity recommendation at step 546.

FIG. 6 is a table illustrating feedback tabulation 600 of the system in accordance with at least one embodiment. While each of the measures 610, 620, 630, 640, and 650 includes a route recommendation, an overall route intensity recommendation 660 is also tabulated. As set forth above, through previously established cognitive research, baselines for these measures are determined. In addition, the aggregation strategy for these measures is outlined to determine whether the route intensity would be positive, negative, or neutral for each of the metrics. However, instead of a straightforward vote count for the final route recommendation, a weight-based vote count is introduced in order to account for the hierarchical relationship of significance amongst the measures. The prioritization, weightage, and rationale are further explained below.

The paraphrase measure is weighted with one point. It is important to clarify any ambiguous statements with clients and reassure them that their challenges are being understood. Paraphrasing can help convey clearer intentions and reaffirm the client's goals. However, paraphrasing too often can also be construed negatively, and hence, is at the lower end of the prioritized intensity contribution.

The pivot measure is weighted with one point. Pivoting from the client's response can be construed significantly more positively than pivoting from a previous participant statement. Doing this too often is disadvantageous as it can be construed by the client in a negative way. Hence, pivot ties in at least priority with paraphrase.

The probe measure is weighted with two points. Asking the right questions is important for every effective salesman. The right questions elicit verbose answers from the client, enabling the participant to learn more about the client's thought process and verify some of the client's inherent assumptions. The greater the questions that are more open ended, the more likely the client is to be drawn into the sale, as the client believes that the participant is empathizing.

The pause measure is weighted with three points. Pauses convey a powerful message in any conversation. Pauses can reflect an intention to listen and be patient and convey to the client that his concerns are being taken up seriously. Pauses can also help a participant buy some time to determine the best strategy to handle the client's concerns or re-think a new approach towards a sales pitch that isn't going in the right direction.

The passion measure is weighted with four points. A passionless speech is typically going to lead to negative outcomes, irrespective of whether the other metrics were in positive or negative. Hence, passion is crucial to ensuring a successful sales pitch, and receives the highest weightage of four points.

If a tie were to occur, the route intensity with the highest weighted measure is recommended as the final intensity for that interaction. Each calculated metric is stored for future retrieval so that final feedback can be provided based on the values measured across the conversation or exercise, and not the last route waypoint. Feedback is provided for each of the measures based on aggregated values on the calculated metrics. In addition to overall feedback, for each metric, specific feedback pertaining to the participant may be sent. This ensures that feedback is fair and more triangulated towards gearing the learner up to perform better. The feedback may be provided to the participant at various steps. Feedback is generated after every sentence but may be withheld so as not to increase the cognitive load of the participant. In embodiments of the invention, a global feedback is provided that tells the participant about her overall performance and where she did well and where she can improve. The feedback is created in such a manner that it motivates and encourages the participant.

Figure 7:
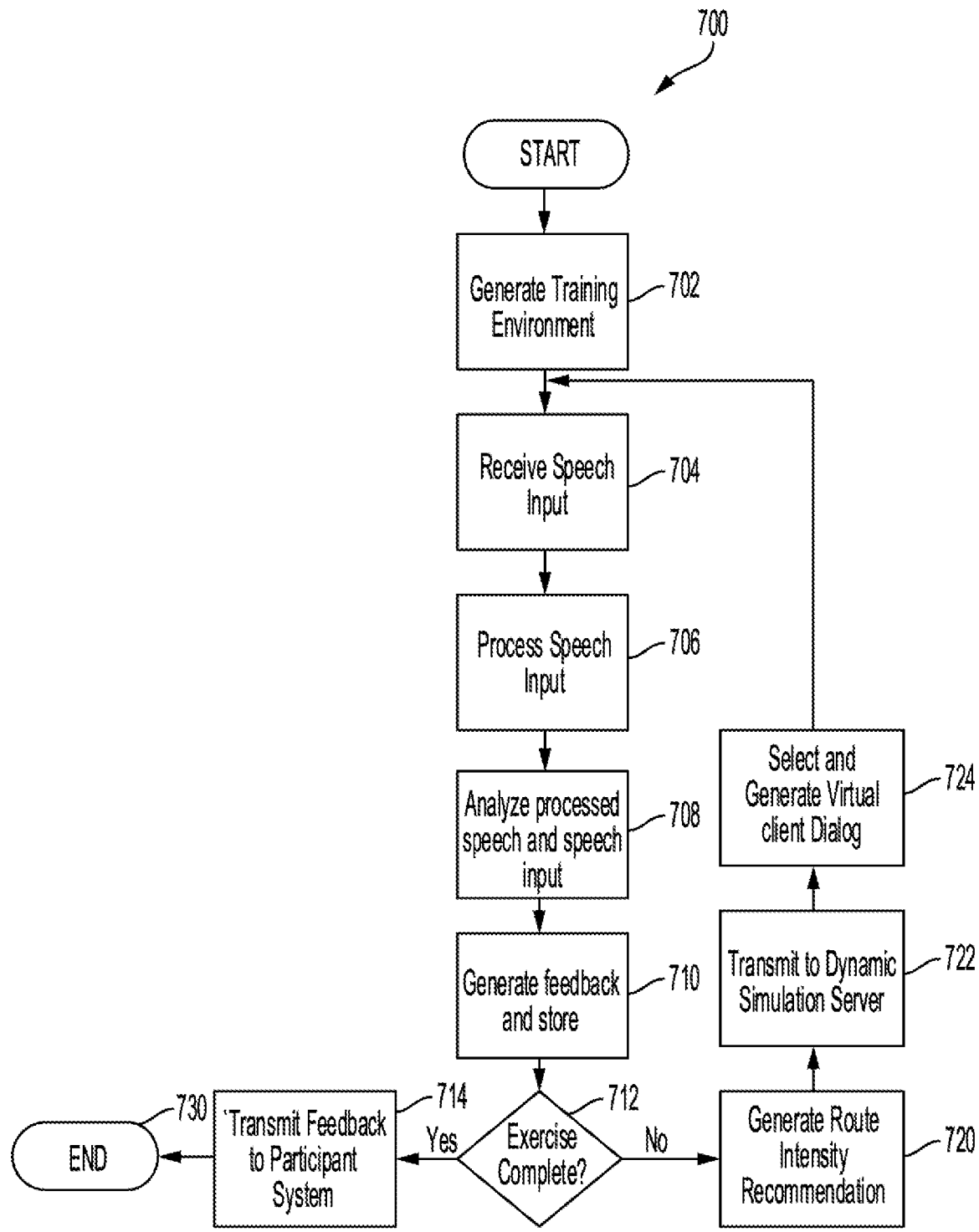
FIG. 7 is a flow diagram illustrating a computer implementable method for evaluating and enhancing speech or conversational effectiveness in accordance with at least one embodiment.

FIG. 7 is a flow diagram illustrating a computer implementable method for evaluating and enhancing conversational effectiveness in accordance with at least one embodiment.

The method begins at step 700 and the system generates a training environment in step 702. The generated training environment may, in an embodiment of the invention, include a sales experience within a virtual office environment. The virtual office environment may include multiple clients seated across a table. An interactive interview is rendered, where the system participant pitches to the computer-controlled virtual client.

In response to receipt of the training environment at the participant system, the participant begins speaking and the system receives speech input at step 704. The system processes the received speech input at step 706. The processing at step 706 includes speech-to-text conversion by the NLP. The NLP performs further semantic processing on the converted text in step 706 in order to identify parts of speech and particular words for use in the subsequent analysis. Further, as the speech is also analyzed directly without being converted to text, both the speech and processed text are transferred to the speech effectiveness analysis processor for analysis and quantification.

Analysis and quantification occur at step 708. The analysis includes quantification of the metrics as described above and the speech effectiveness analysis processor extracts information stored in memory to perform operations required for quantification. The information extracted from memory includes stored operations, but in some instances, for example with respect to the pivot measure and the paraphrase measure, the speech effectiveness analysis processor also requires previously recorded data as quantification of these measures requires a comparison with previous utterances. Thus, the speech effectiveness analysis processor extracts previous utterances from memory.

At step 710, the system generates feedback by evaluating recommended route intensity for each of the identified metric but does not necessarily deliver the feedback and instead stores the analysis and feedback for future use.

At step 712, the system determines if the training exercise is complete. In embodiments of the invention, the training exercise is designed to have a predetermined duration, for example, ten to fifteen minutes. If the training exercise is complete at step 712, the system transmits the feedback to the participant in step 714. The transmitted feedback may be presented in a variety of forms and may include the information shown in FIG. 6. The system provides feedback based on quantification of the five measures calculated from individual utterances and overall performance. The feedback can be provided at an individual metric level and measure level, as well as at a global overall level.

However, if the exercise is not complete at step 712, the system generates the route intensity recommendation and in step 720 and transmits the recommendation to the dynamic simulation processor in step 722. In step 724, the dynamic simulation processor dynamically selects and generates a virtual client dialog for interaction with the system participant. The selection is made from a plurality of scripted client responses associated with positive, negative, and neutral conversation flows. The system returns to receiving speech input at step 704.

The system as illustrated in the block diagrams and flowcharts of the above-described Figures includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, the system, and the computer program product, as described above, have numerous advantages. For example, embodiments of the invention enhance and simplifying the learning experience, thereby reducing resources required for training. Furthermore, embodiments of the invention serve to quantify metrics that have previously only been considered subjectively. The quantified metrics can more easily serve as benchmarks for users in the virtual training environment. Thus, embodiments of the invention may be useful for reducing costs, increasing returns on investments, improving process performance, and freeing up resources for other uses.

All of the components shown in the FIGs. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a microcontroller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

A person with ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc. The claims can encompass embodiments for hardware, software, or a combination thereof.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements. [While particular embodiments of the invention have been illustrated and described in detail herein, it should be understood that various changes and modifications might be made to the invention without departing from the scope and intent of the invention.

What is claimed is:

1. An automated training system for enhancing conversational effectiveness of a system participant interacting with a virtual client, the system comprising:
   an input interface receiving speech input from a system participant system;
   a natural language processor operating on the speech input to produce text;
   a memory storing multiple scripts used by the virtual client during interaction with the system participant;
   a speech effectiveness analysis processor receiving the speech input and the text as input parameters and producing quantified measures of speech effectiveness based on the input parameters, the quantified measures including at least a passion measure and a pause measure, the quantified measures produced based on metrics including at least including loudness, pitch, and speech rate;
   a feedback generator receiving the quantified measures, generating personalized feedback based on the quantified measures, and transmitting the personalized feedback to the system participant system; and
   a dynamic simulation processor receiving the quantified measures from the speech effectiveness analysis processor and generating a virtual client dialog selecting one of the multiple stored scripts from the memory based on the quantified measures, wherein the virtual client responds to the speech input using the generated virtual client dialog.

2. The system of claim 1, wherein the feedback generator generates a route intensity recommendation for each of the quantified measures, wherein the route intensity recommendation is one of negative, neutral, and positive.

3. The system of claim 2, wherein the feedback generator combines the quantified measures in a weighted combination to derive an overall route intensity recommendation.

4. The system of claim 3, wherein the feedback generator delivers the overall route intensity recommendation to the dynamic simulation processor and the dynamic simulation processor generates the virtual client dialog based on the overall route intensity recommendation, wherein the stored scripts are associated with one of a positive, negative, and neutral route intensity.

5. The system of claim 4, wherein generating the virtual client dialog comprises selecting the script from memory based on the overall route intensity recommendation.

6. The system of claim 1, wherein the quantified measures include at least a probe measure and a pivot measure.

7. The system of claim 1, wherein the speech effectiveness analysis processor quantifies at least the metrics including loudness, pitch, and speech rate to quantify the passion measure.

8. The system of claim 1, wherein the speech effectiveness analysis processor quantifies at least metrics including silence, speech rate, and word duration to quantity the pause measure.

9. The system of claim 6, wherein to quantify the probe measure, the speech effectiveness analysis processor determines a number of probes in an utterance.

10. An automated training method for enhancing conversational effectiveness of a system participant interacting with a virtual client, the method comprising:
    storing in a memory, multiple scripts used by the virtual client during interaction with the system participant;
    receiving speech input from the system participant at an input interface of a system participant system;
    operating on the speech input using a natural language processor to produce text;
    receiving the speech input and the text as input parameters at a speech effectiveness analysis processor and producing quantified measures of speech effectiveness based on the input parameters, the quantified measures produced based on metrics including at least including loudness, pitch, and speech rate;
    generating personalized feedback based on the quantified measures, and transmitting the personalized feedback to the system participant system; and
    generating a virtual client dialog using a dynamic simulation processor, the dynamic simulation processor receiving the quantified measures from the speech effectiveness analysis processor and generating a virtual client dialog by selecting one of the multiple stored scripts from the memory based on the quantified measures, wherein the virtual client responds to the speech input from the system participant system using the generated virtual client dialog.

11. The method of claim 10, further comprising generating a route intensity recommendation for each of the quantified measures, wherein the route intensity recommendation is one of negative, neutral, and positive.

12. The method of claim 11, further comprising combining the quantified measures in a weighted combination to derive an overall route intensity recommendation.

13. The method of claim 12, further comprising delivering the overall route intensity recommendation to the dynamic simulation processor, wherein the dynamic simulation processor generates the virtual client dialog based on the overall route intensity recommendation, wherein the stored scripts are associated with one of a positive, negative, and neutral route intensity.

14. The method of claim 13, wherein generating the virtual client dialog comprises selecting the script from the memory based on the overall route intensity recommendation.

15. The method of claim 10, wherein the quantified measures include at least a probe measure and a pivot measure.

16. The method of claim 10, wherein the speech effectiveness analysis processor quantifies at least the metrics including loudness, pitch, and speech rate to quantify the passion measure.

17. The method of claim 10, wherein the speech effectiveness analysis processor quantifies at least the metrics including silence, speech rate, and word duration to quantify the pause measure.

18. The method of claim 15, wherein to quantify the probe measure, the speech effectiveness analysis processor determines a number of probes in an utterance.

19. A non-transitory computer readable medium comprising a computer readable program code embodied therein for evaluating and enhancing conversational effectiveness, wherein upon execution by a processor, the code causes the processor to perform a method comprising:

storing in a memory, multiple scripts used by a virtual client during interaction with a system participant;

receiving speech input from the system participant at an input interface of a system participant system;

operating on the speech input using a natural language processor to produce text;

receiving the speech input and the text as input parameters at a speech effectiveness analysis processor and producing quantified measures of speech effectiveness based on the input parameters, the quantified measures produced based on metrics including at least including loudness, pitch, and speech rate;

generating personalized feedback based on the quantified measures, and transmitting the personalized feedback to the system participant system; and generating a virtual client dialog based on the quantified measures using a dynamic simulation processor, the dynamic simulation processor receiving the quantified measures from the speech effectiveness analysis processor and generating the virtual client dialog by selecting one of the multiple stored scripts from the memory based on the quantified measures, wherein the virtual client responds to the speech input from the system participant system using the generated virtual client dialog.

20. The non-transitory computer readable medium of claim 19, further comprising program instructions for generating a route intensity recommendation for each of the quantified measures.

* * * * *